(No Model.) 3 Sheets—Sheet 1.

J. L. DYER & J. A. BERRY.
TWO WHEELED VEHICLE.

No. 336,513. Patented Feb. 16, 1886.

(No Model.) 3 Sheets—Sheet 2.
J. L. DYER & J. A. BERRY.
TWO WHEELED VEHICLE.
No. 336,513. Patented Feb. 16, 1886.
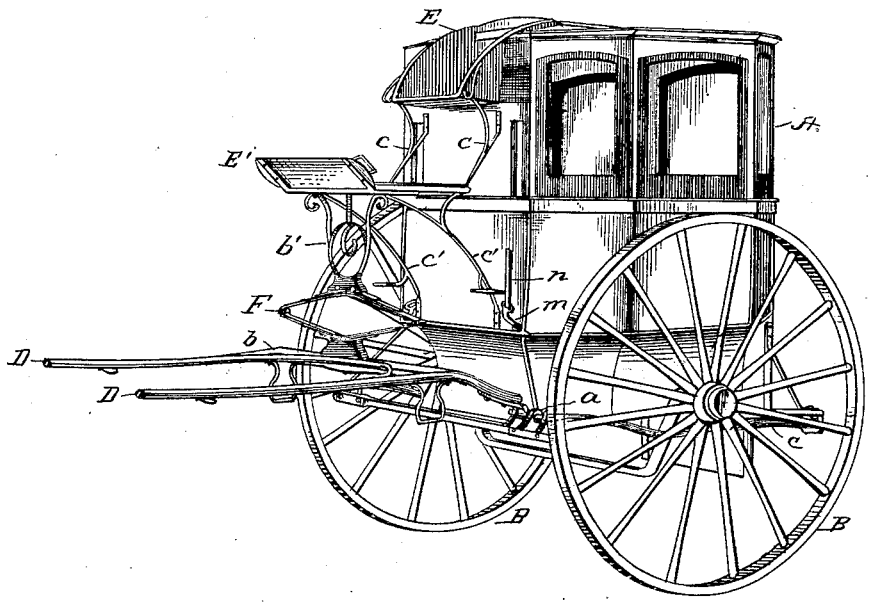
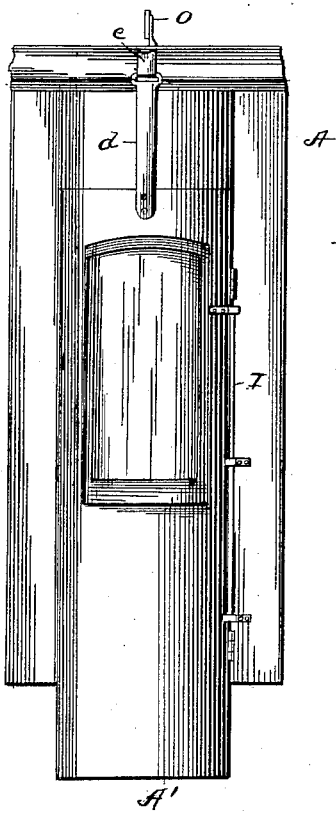
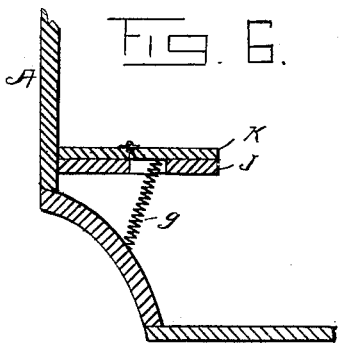
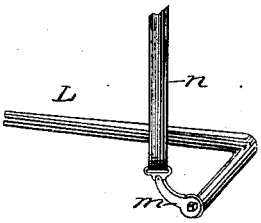
WITNESSES
Norris A. Clark.
Jno. O. Schroeder.
INVENTOR
James L. Dyer
John A. Berry
by Geo Wilson
atty (No Model.) 3 Sheets—Sheet 3.
J. L. DYER & J. A. BERRY.
TWO WHEELED VEHICLE.
No. 336,513. Patented Feb. 16, 1886.
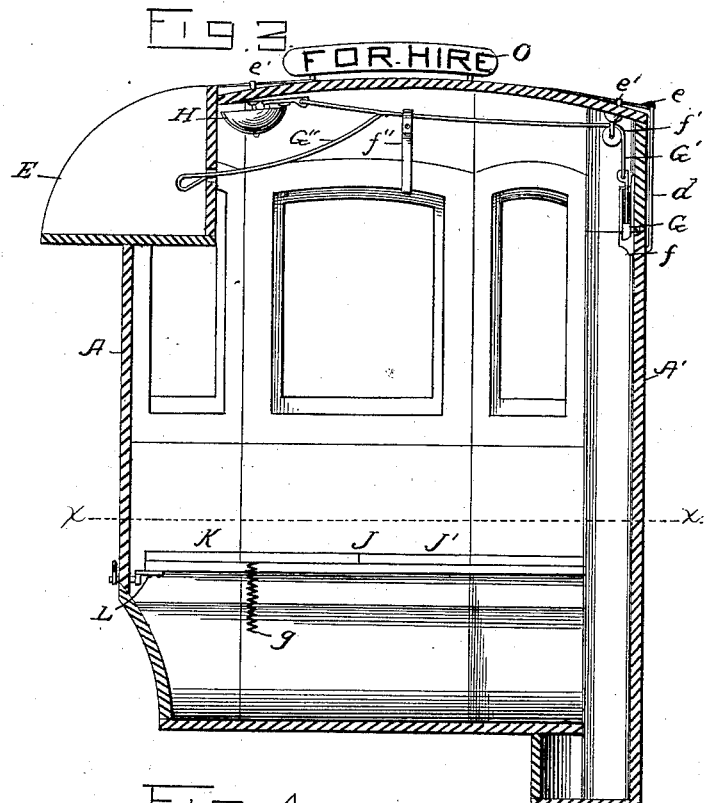
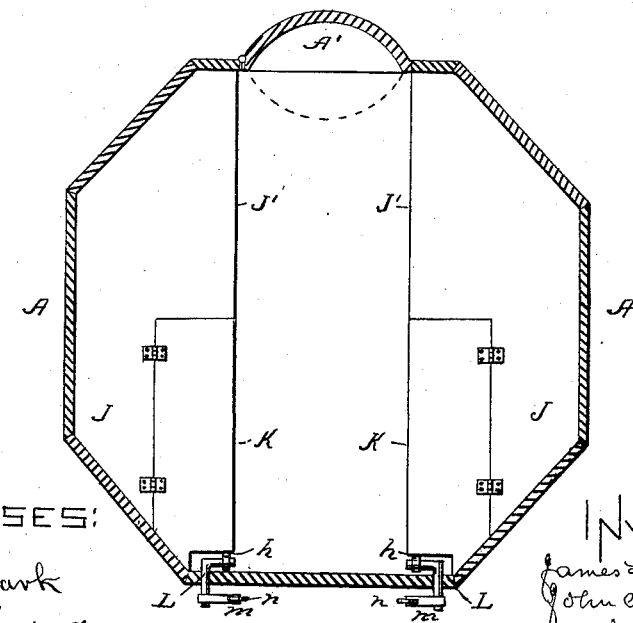
WITNESSES:
Norris A. Clark
Jno. C. Schroeder
INVENTOR:
James L. Dyer
John A. Berry
by Geo. W. Dyer
Atty

UNITED STATES PATENT OFFICE.

JAMES L. DYER AND JOHN A. BERRY, OF ELMIRA, NEW YORK.

TWO-WHEELED VEHICLE.

SPECIFICATION forming part of Letters Patent No. 336,513, dated February 16, 1886.

Application filed September 12, 1885. Serial No. 176,898. (No model.)

*To all whom it may concern:*

Be it known that we, JAMES L. DYER and JOHN A. BERRY, of Elmira, in the county of Chemung and State of New York, have invented a new and useful Improvement in Passenger-Vehicles; and we do hereby declare that the following is a full and exact description of the same, reference being had to the accompanying drawings, and to the letters of reference marked thereon.

Our invention relates more particularly to the class of vehicles or cabs commonly known as "two-wheeled herdics," and involves improvements whereby the general appearance and utility of such a vehicle are improved upon, and greater conveniences are afforded passengers, and whereby the most of the weight is imposed upon the axle, instead of upon the horse, as has heretofore been the case in vehicles of this class.

These improvements are confined principally to the body of the cab, the driver's seat, and an elastic connection between the shafts or thills and the driver's foot-rest; and the novelty consists in the construction, arrangement, and combination of these and other portions of the vehicle, all as more fully hereinafter described, and pointed out in the claims.

For a more thorough understanding of our improvements, in connection with the following description, attention is invited to the accompanying drawings, in which—

Figure 1:
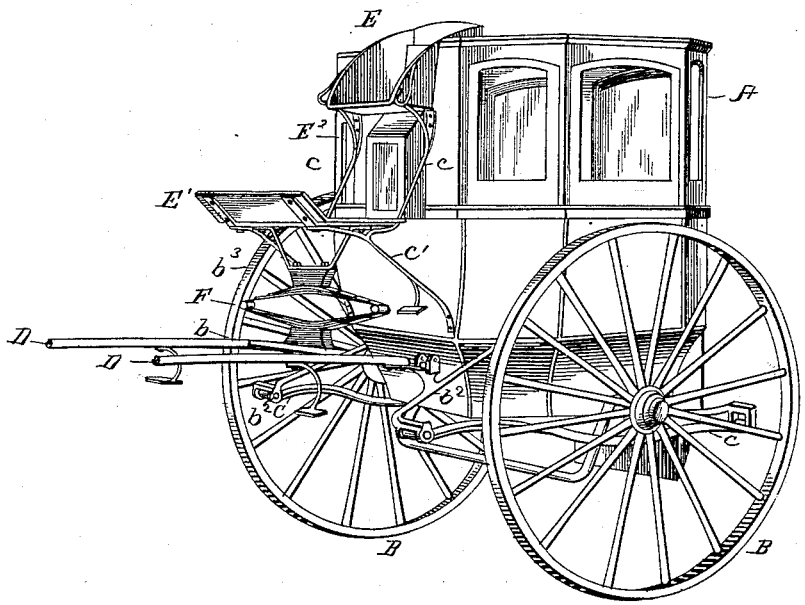
Figure 2:
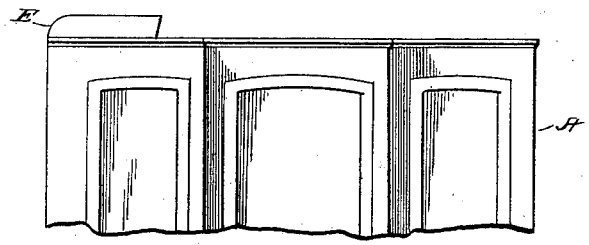

Figure 1 is a perspective view of our improved cab. Fig. 2 is a perspective view of a cab slightly different from the one represented in Fig. 1; Fig. 3, a vertical central section of the body of the cab shown in Fig. 2; Fig. 4, a transverse section of the body on the line $xx$, Fig. 3; Fig. 5, an elevation of the rear end of the vehicle; Fig. 6, a detail view of one of the hinged seats; Fig. 7, a view in detail of the means for operating the hinged seats; and Fig. 8 is a detail showing a different arrangement of the driver's seat.

Like letters denote corresponding parts in the several views.

A denotes the body of the cab, made eight-sided or octagon in outline, which shape relieves the vehicle of the heavy and cumbersome box-like appearance of vehicles of this class.

B B are the wheels, C C the side springs, and D D the thills or shafts, all of ordinary construction. In the forward upper end of this body is located the driver's seat E, one-half of same extending inside the body, or, as shown in Fig. 8, the seat may be located outside on the top of the cab, at its upper front end, either of which arrangements enables the driver to see in all directions, and throws his weight not upon the shafts of the vehicle, but upon the axle, which thereby not only relieves the horse of the weight, but permits the shafts to have unrestrained movement up and down with the movement of the horse, resulting in a complete gig motion. This movement, however, is not imparted to the body of the cab, but is avoided by means of ordinary thill-couplings, $a\ a$, used in connecting the rear ends of the shafts with a cross-bar projecting from the body, or by means of a loose connection of the shafts with a pair of curved braces, $b^2 b^2$, secured to the front side of the cab and connecting with the forwards ends of the side springs, C C. The movements of the shafts D D are, however, somewhat limited and relieved by means of a spring, F, which is arranged between the shafts D D and the foot-rest E' for the driver, as shown in Fig. 1. This spring may be elliptic, semi-elliptic, spiral, or of any other well-known and suitable shape, but is preferably an elliptic spring, and is mounted upon a cross-bar, $b$, which connects the shafts directly, or nearly so, under the foot-rest E', while its upper half is secured at its center to a vertical brace, $b^3$, supporting the driver's foot-rest, as in Fig. 1, or to a block attached to a skeleton frame-work, $b'$, which supports the foot-rest E'. (Shown in Fig. 2.) This foot-rest is secured to the driver's seat and to the front of the cab-body by metal rods or braces $c$ and $c'$, the latter having suitable steps to serve the driver in mounting his seat. To the front side of the cab and on the outside intermediate the driver's seat and the foot-rest E' is secured a box, $E^2$, for holding a lamp, as shown in Fig. 1.

The back of the vehicle has two doors or a hinged semi-elliptic door, A', provided at its top on the outside with a vertical metal strip, $d$, which is provided on its upper end with a loop projecting a little above the roof of the cab. To this loop, on the strip $d$, is attached one end of a strap, cord, or wire, $e$, which extends or runs forward to the front of the cab within convenient reach of the driver, and this strap, cord, or wire passes, preferably, through guides $e'$ $e'$ on the roof of the cab, and furnishes the means for closing the door.

On the inside of the cab, above the door, is provided a spring-latch or spring-bolt, G, the lower end of which engages with a catch, $f$, secured to the inside of the door at its top, and holds the same closed. To the upper end of this latch or bolt G is attached a strap, cord, or wire, G', which passes up over a pulley or other suitable guide and support, $f'$, and thence across under the roof to the front of the cab, where it is attached to a signal-bell, H, which is located just in the rear of the driver's seat. A strap, $f''$, hangs from this strap, wire, or cord G', intermediate its points of connection and within convenient reach of the passengers. A passenger desiring to alight, by pulling on this strap $f''$ signals the driver by ringing the bell, and at the same time draws the bolt or latch G, and unlatches the door, which opens automatically by means of a torsion-spring, I, secured on the outside between the hinges of the door, as shown in Fig. 5.

To enable the driver to open the door when a passenger wishes to enter the cab, a branch strap, G'', is attached to the main strap G' back of its connection with the signal-bell, and passes through the front of the cab within convenient reach of the driver.

The seats J J and J' J' on the inside of the cab run lengthwise on each side of same, and are divided centrally, so as to leave each independent of the other. To properly load the cab and to prevent the first two passengers from occupying the front seats, thereby imposing their weight upon the horse, the rear side seats, J' J', are made permanently ready for use, while the front side seats, J J, are provided with hinged extensions K K, which are only lowered when carrying more than two passengers. These extensions fold up at right angles to the seats, to which they are hinged, and are retained by a spring, $g$, as shown in Fig. 6. These hinged extensions can be raised or brought to a position on a level with the seats, as shown in Figs. 4 and 6, by means of straps, ropes, or levers operated by passengers or driver; but it is preferred to have them under the control of the driver by hand or foot, and by the following means: To each seat extension K, upon the end next to the front of the cab, is secured a loop, $h$, in which the long arm of a crank, L, has end bearing, and the shorter arm of each of these cranks L passes through the front side of the cab and is provided on its outer end with a small crank, M, to which is attached the strap N, or other means passing up to the driver, whereby he can raise or lower the hinged extensions. Instead of a strap for this purpose, an appropriate substitute could be made, consisting of a rod having connection at its upper end with a foot-lever fulcrumed upon the foot-rest E', with suitable means for holding the lever so as to retain the hinged extensions elevated. It will be seen that these hinged extensions are not only independently arranged, but are operated independently, so that in case only three passengers are in the cab, only one of the seat-extensions need be lowered.

On the roof of the cab is hinged a sign or indicator, O, which reads "For Hire," and is arranged lengthwise of the vehicle. If the cab is not engaged, the sign or indicator can be raised and secured in position to be easily read, otherwise it will be turned down on the roof out of sight.

The door-operating device and signal herein described and illustrated are reserved for the subject of a future application.

What we claim, and desire to secure by Letters Patent, is—

1. In a vehicle of the character described, the body A, made octagon and provided with a driver's seat set in the front side above the horizontal plane of the window-sills, substantially as and for the purposes set forth.

2. In a vehicle of the character described, a pair of hinged seats and means for operating the same, substantially as set forth.

3. In a vehicle of the character described, the body A, provided outside on its front below the driver's seat with a box, $E^2$, for holding a lamp, substantially as described.

4. In a vehicle of the character described, the combination of a spring mounted between the driver's foot-rest and the shafts, a pair of curved braces extending out from the body and connecting with the front ends of the side springs, and a pair of shafts having loose connection at their rear ends with said braces, substantially as described and shown.

In testimony whereof we affix our signatures in presence of two witnesses.

JAMES L. DYER.
JOHN A. BERRY.

Witnesses:
THOMAS MOLONEY,
O. H. DONNER.